(12) United States Patent
Wang et al.

(10) Patent No.: US 12,192,051 B2
(45) Date of Patent: *Jan. 7, 2025

(54) SCALING FOR SPLIT-NETWORKING DATAPATH

(71) Applicant: VMware LLC, Palo Alto, CA (US)

(72) Inventors: Yong Wang, Sunnyvale, CA (US); Cheng-Chun Tu, Redwood City, CA (US); Sreeram Kumar Ravinoothala, San Jose, CA (US); Yu Ying, Cupertino, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,206

(22) Filed: Jul. 23, 2021

(65) Prior Publication Data

US 2023/0028837 A1 Jan. 26, 2023

(51) Int. Cl.
H04L 41/0816 (2022.01)

(52) U.S. Cl.
CPC .................. H04L 41/0816 (2013.01)

(58) Field of Classification Search
CPC . H04L 41/0816; H04L 67/10; H04L 61/2007; H04L 41/0806; H04L 41/0893; H04L 45/586; H04L 67/34; H04L 12/4641; H04L 41/0803; H04L 41/5025; H04L 47/125; H04L 41/044; H04L 41/0886; H04L 43/12; H04L 45/64; H04L 61/3015; H04L 12/4633; H04L 2212/00; H04L 43/08; H04L 45/04; H04L 45/22; H04L 45/28; H04L 45/306; H04L 45/34; H04L 45/38; H04L 45/50; H04L 61/256; H04L 67/1002; H04L 41/0809; H04L 41/082; H04L 41/0859; H04L 41/14; H04L 41/22; H04L 41/5009; H04L 41/5054; H04L 41/5096; H04L 43/065; H04L 43/0811; H04L 43/10; H04L 43/50; H04L 45/02;
(Continued)

(56) References Cited

U.S. PATENT DOCUMENTS 9,979,602 B1* 5/2018 Chinnakannan ...... H04L 47/765
10,672,044 B2* 6/2020 Inbaraj .................. G06F 9/5077
(Continued)

OTHER PUBLICATIONS

Non-Published Commonly Owned Related U.S. Appl. No. 17/384,211 with similar specification, filed Jul. 23, 2021, 40 pages, VMware, Inc.

Primary Examiner — Greg C Bengzon
(74) Attorney, Agent, or Firm — Quarles & Brady LLP

(57) ABSTRACT

Some embodiments of the invention provide a method for implementing an edge device that handles data traffic between a logical network and an external network. The method monitors resource usage of a node pool that includes multiple nodes that each executes a respective set of pods. Each of the pods is for performing a respective set of data message processing operations for at least one of multiple logical routers. The method determines that a particular node in the node pool has insufficient resources for the particular node's respective set of pods to adequately perform their respective sets of data message processing operations. Based on the determination, the method automatically provides additional resources to the node pool by instantiating at least one additional node in the node pool.

20 Claims, 13 Drawing Sheets

(58) Field of Classification Search
CPC ..... H04L 45/745; H04L 47/26; H04L 47/781; H04L 49/35; H04L 49/70; H04L 61/2038; H04L 61/6022; H04L 63/0263; H04L 63/20; H04L 67/02; H04L 67/1023; H04L 67/1031; H04L 67/1097; H04L 67/14; H04L 67/18; H04L 67/22; H04L 67/28; H04L 67/325; H04L 12/28; H04L 12/2801; H04L 12/281; H04L 12/2814; H04L 12/2818; H04L 12/2898; H04L 12/4625; H04L 12/4666; H04L 41/046; H04L 41/0668; H04L 41/12; H04L 41/24; H04L 41/5019; H04L 41/5051; H04L 43/028; H04L 43/16; H04L 45/123; H04L 45/54; H04L 45/70; H04L 45/72; H04L 45/74; H04L 47/20; H04L 47/78; H04L 47/782; H04L 47/803; H04L 47/82; H04L 49/25; H04L 49/354; H04L 63/08; H04L 67/1008; H04L 67/1036; H04L 67/1051; H04L 67/1095; G06F 9/45558; G06F 2009/45595; G06F 9/5077; G06F 9/455; G06F 2009/45562; G06F 8/60; G06F 9/44526; G06F 2009/45579; G06F 9/45545; G06F 2009/4557; G06F 2009/45583; G06F 9/45533; G06F 9/4881; G06F 9/5027; G06F 11/3006; G06F 11/301; G06F 11/302; G06F 11/3442; G06F 11/3452; G06F 2209/504; G06F 3/0619; G06F 3/0646; G06F 3/0662; G06F 3/067; G06F 8/65; G06F 9/44505; G06F 9/50; G06F 9/5055; G06F 9/5072; G06F 9/54; G06F 9/541; G06F 9/547; G06F 11/34; G06F 11/3414; G06F 11/3495; G06F 16/178; G06F 16/53; G06F 16/90335; G06F 2009/45591; G06F 21/602; G06F 21/79; G06F 2209/5019; G06F 8/63; G06F 8/71; G06F 9/3877; G06F 9/3891; G06F 9/445; G06F 9/5066

See application file for complete search history.

(56) References Cited

U.S. PATENT DOCUMENTS

| | | | |
|---|---|---|---|
| 10,708,082 B1* | 7/2020 | Bakiaraj | H04L 12/4641 |
| 10,855,531 B2* | 12/2020 | Vaidya | H04L 61/3015 |
| 10,944,691 B1 | 3/2021 | Raut et al. | |
| 10,949,313 B2* | 3/2021 | Bernat | G06F 21/71 |
| 10,965,752 B1* | 3/2021 | Smith | H04L 67/60 |
| 11,050,620 B2* | 6/2021 | Reed | H04L 41/0897 |
| 11,074,091 B1* | 7/2021 | Nayakbomman | G06F 9/455 |
| 11,159,366 B1* | 10/2021 | Gawade | H04L 67/1002 |
| 11,201,955 B1* | 12/2021 | Sachdeva | G06F 9/45558 |
| 11,316,822 B1* | 4/2022 | Gawade | G06F 11/2025 |
| 11,329,918 B2* | 5/2022 | Sarva | H04L 45/745 |
| 2016/0034310 A1* | 2/2016 | Garg | G06F 9/5088 718/104 |
| 2017/0054591 A1* | 2/2017 | Hyoudou | H04L 45/583 |
| 2017/0085486 A1* | 3/2017 | Chung | H04W 72/0426 |
| 2017/0126500 A1 | 5/2017 | Eggen et al. | |
| 2018/0367605 A1* | 12/2018 | Maity | H04L 67/1008 |
| 2019/0042298 A1* | 2/2019 | Sunku | G06F 9/5027 |
| 2019/0068439 A1* | 2/2019 | Inbaraj | H04L 47/70 |
| 2019/0081905 A1* | 3/2019 | Inbaraj | H04L 41/0893 |
| 2019/0087297 A1* | 3/2019 | Inbaraj | G06F 11/3034 |
| 2019/0089483 A1* | 3/2019 | Rathineswaran | G06F 11/3452 |
| 2019/0166032 A1* | 5/2019 | Inbaraj | H04L 43/0876 |
| 2019/0384376 A1* | 12/2019 | Mathews | G06F 1/206 |
| 2020/0073692 A1* | 3/2020 | Rao | G06F 9/5077 |
| 2020/0099610 A1* | 3/2020 | Heron | H04L 45/34 |
| 2020/0112487 A1* | 4/2020 | Inamdar | H04L 67/14 |
| 2020/0204481 A1* | 6/2020 | Heron | G06F 9/5027 |
| 2020/0204492 A1* | 6/2020 | Sarva | H04L 67/34 |
| 2020/0225724 A1* | 7/2020 | MacNamara | G06F 1/3287 |
| 2020/0252458 A1* | 8/2020 | Bhatia | H04L 41/32 |
| 2020/0403872 A1* | 12/2020 | Shivashankara | H04L 67/10 |
| 2021/0019194 A1 | 1/2021 | Bahl et al. | |
| 2021/0067484 A1 | 3/2021 | Parab et al. | |
| 2021/0084103 A1* | 3/2021 | Smith | G06F 9/5088 |
| 2021/0126871 A1* | 4/2021 | Bonas | H04L 67/28 |
| 2021/0185125 A1* | 6/2021 | Smith | G06F 9/5088 |
| 2021/0271523 A1* | 9/2021 | Parthasarathy | G06F 11/1464 |
| 2021/0303365 A1* | 9/2021 | Li | G06F 9/5072 |
| 2021/0328858 A1* | 10/2021 | Asveren | H04L 61/2007 |
| 2022/0038311 A1 | 2/2022 | Shen et al. | |
| 2022/0131852 A1 | 4/2022 | Sharma et al. | |

* cited by examiner

SCALING FOR SPLIT-NETWORKING DATAPATH

BACKGROUND

Today, Kubernetes is the de-facto orchestration platform that automates the process of deploying and managing micro-service-based cloud-native applications at massive scale. However, unique challenges exist with how networking functions can leverage the benefits offered by Kubernetes, such as better scalability, resiliency, and elasticity. These unique challenges exist partly due to network function virtualization (NFV) data plane functions differing greatly from web and database applications where Kubernetes has been proven to be mostly successful.

Edge node architecture is often based on a monolithic appliance model. For example, some edge nodes use a datapath built on Data Plane Development Kit (DPDK), which is a widely used kernel-bypassing networking technology designed to maximize networking performance. DPDK moves control of the networking hardware out of the kernel and into the application, thus removing the overhead of context switches and kernel-user-space crossing, along with other optimizations. The current multi-tenancy high performance edge appliances based on this architecture work well, in particular for layer 4 (L4) services that are tightly integrated with the DPDK poll mode driver (PMD) threads. However, with more networking and security functions moving to the application layer (L5-L7), this architecture has shown its limitations.

BRIEF SUMMARY

Some embodiments of the invention provide a system for implementing one or more logical routers using a Kubernetes cluster having multiple nodes, each of which executes a set of pods. The nodes of the Kubernetes cluster, in some embodiments, collectively implement an edge device that processes data messages at a boundary between a logical network and external network. To implement the edge device, the pods in the cluster include a first pod that performs a first set of data message processing operations for multiple logical routers and at least one separate pod for each of the logical routers. Each of these separate pods performs a respective second set of data message processing operations for the corresponding logical router. In some cases, multiple Kubernetes clusters may be used to implement multiple such edge devices.

In some embodiments, each of the pods executed by the nodes in the Kubernetes cluster is a virtual machine (VM) and each of the VMs execute on a same host computer. Alternatively, in some embodiments, the VMs are distributed across multiple host computers. For example, in some embodiments, different pools of VMs execute on different host computers, with each pool including VMs having the same configuration. In other embodiments, each node in the cluster is instead a physical machine.

The multiple nodes, in some embodiments, include (i) a master node and (ii) multiple worker nodes on which the pods execute. In some embodiments, the master node is responsible for scheduling the pods on the worker nodes by selecting which pods are to execute on which nodes. For example, in some embodiments, the first pod is scheduled to execute on a first one of the nodes and the separate pods for the individual logical routers are distributed across the multiple nodes (i.e., scheduled across the multiple nodes). The first pod, in some embodiments, is affinitized to the first node (i.e., pinned to the first node so that it is not moved between nodes), while the separate pods for the logical routers are moved between the multiple nodes based on resource usage (or other factors). In some such embodiments, one or more of the separate pods for the multiple logical routers executes on the first node along with the first pod.

In some embodiments, the first pod is a layer 4 (L4) pod. The L4 pod, in some embodiments, executes a set of run-to-completion threads for processing data messages sent between the logical network and the external network and a set of control threads for handling control plane operations. Each respective run-to-completion thread, in some embodiments, is assigned to a respective core of a first set of cores of a computing device on which the first pod executes, while the set of control threads are scheduled between a second set of cores of the computing device.

The set of data processing operations performed by the L4 pod for multiple logical routers, in some embodiments, includes layer 2-layer 4 (L2-L4) operations, such as L2/L3 lookups, tunnel termination/encapsulation, firewall processing, packet updating, and byte counters. This can include logical network processing, such as logical switching and logical routing operations. Each logical router is configured (e.g., by a user) to perform a respective set of services on data messages handled by that logical router, and the set of data message processing operations performed by the respective separate pod for these logical routers includes the respective set of services configured for the logical router. These services, in some embodiments, include layer 5-layer 7 (L5-L7) services, such as layer 7 firewall services, transport layer security (TLS) services, layer 7 load balancing services, uniform resource locator (URL) filtering, and domain name service (DNS) forwarding. In some embodiments, for a particular one of the logical routers, each service of the set of services configured for the particular logical router is assigned to a separate pod.

A logical router may be defined to include a distributed router and one or more centralized routers. In some embodiments, the separate pods for such a logical router includes a pod for the distributed router and additional pods for each of the centralized routers.

Some embodiments use autoscaling operations to provide better scalability to the edge device. In some embodiments, an autoscaler (e.g., cluster autoscaler) that runs in the master node as part of the control plane monitors resource usage on nodes in the various node pools that make up a cluster (i.e., by monitoring the number of resource requests made on nodes in different pools in the cluster). The autoscaler, in some embodiments, determines whether any nodes have insufficient resources for their respective sets of pods to adequately perform their respective sets of data message processing operations and/or whether any nodes have underutilized resources.

Based on these determinations, the autoscaler of some embodiments increases or decreases the number of nodes in the node pool. In some embodiments, the number of nodes in the node pool is constrained by minimum and maximum node pool sizes specified during configuration. When the autoscaler instantiates additional nodes in a node pool, in some embodiments, the autoscaler reschedules pods from nodes with insufficient resources to the newly instantiated nodes and increases the amount of resources allocated to the pods. In some embodiments, when a node is determined to have underutilized resources, the autoscaler reschedules the pods from that node to other nodes in the pool and deletes the node from the pool.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
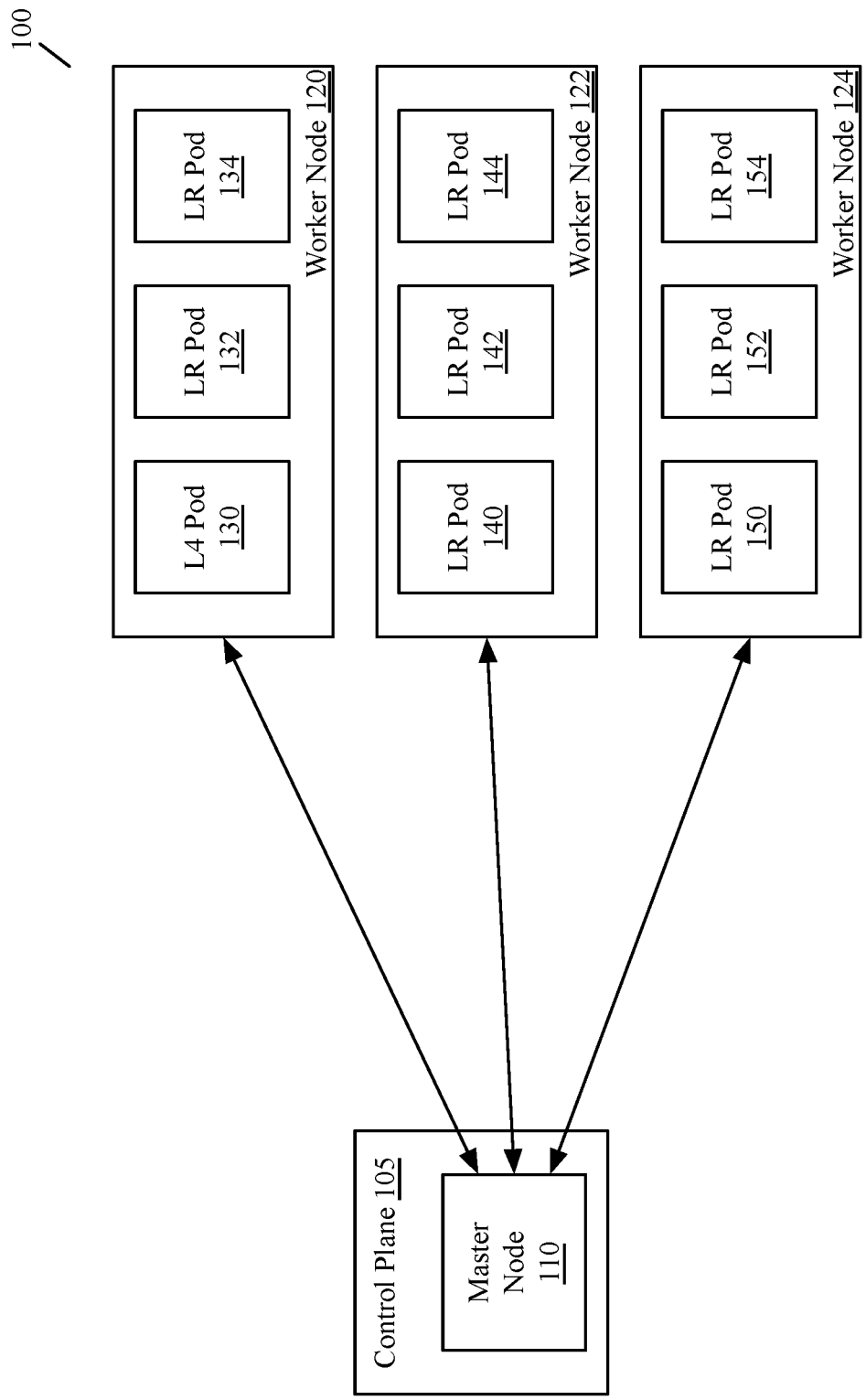
FIG. 1 illustrates an overview of edge architecture in which a Kubernetes cluster implements an edge device, in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a system for implementing one or more logical routers using a Kubernetes cluster having multiple nodes, each of which executes a set of pods. The nodes of the Kubernetes cluster, in some embodiments, collectively implement an edge device that processes data messages at a boundary between a logical network and external network. To implement the edge device, the pods in the cluster include a first pod that performs a first set of data message processing operations for multiple logical routers and at least one separate pod for each of the logical routers. Each of these separate pods performs a respective second set of data message processing operations for the corresponding logical router. In some cases, multiple Kubernetes clusters may be used to implement multiple such edge devices.

The multiple nodes of the Kubernetes cluster, in some embodiments, are grouped into various node pools, with each node pool including nodes all having the same configuration (i.e., each node pool includes nodes of a respective type). In some embodiments, changing the configuration of one node in a node pool causes the configuration of all of the other nodes in the pool to change. While having the same configuration, each node in a node pool executes a different set of pods, with varying amounts of resources allocated to each pod. In some embodiments, when a particular pod executing on a node requires more resources than are available on that node, an autoscaling operation is performed in order to provide additional resources for the particular pod or to provide additional instances of the particular pod to distribute the load that the particular pod is responsible for, as will be described further below.

In some embodiments, each of the pods executed by the nodes in the Kubernetes cluster is a virtual machine (VM) and each of the VMs execute on a same host computer. Alternatively, in some embodiments, the VMs are distributed across multiple host computers. For example, in some embodiments, different pools of VMs execute on different host computers, with each pool including VMs having the same configuration. In other embodiments, each node in the cluster is instead a physical machine.

The multiple nodes, in some embodiments, include (i) a master node and (ii) multiple worker nodes on which the pods execute. In some embodiments, the master node is responsible for scheduling the pods on the worker nodes by selecting which pods are to execute on which nodes. For example, in some embodiments, the first pod is scheduled to execute on a first one of the nodes and the separate pods for the individual logical routers are distributed across the multiple nodes (i.e., scheduled across the multiple nodes).

In some embodiments, certain pods are scheduled to certain nodes and cannot be rescheduled to other nodes. The first pod, in some embodiments, is affinitized to the first node (i.e., pinned to the first node so that it is not moved between nodes), while the separate pods for the logical routers are moved between the multiple nodes based on resource usage (or other factors). In some such embodiments, one or more of the separate pods for the multiple logical routers execute on the first node along with the first pod. Other pods that cannot be rescheduled can include, for example, pods having local storages and pods that are not managed by a controller.

FIG. 1 illustrates an overview of edge architecture 100 in which a Kubernetes cluster implements an edge device, in some embodiments. As shown, the edge architecture 100 includes a master node 110 that is part of the control plane 105, and a cluster of worker nodes 120, 122, and 124 that each include a respective set of pods. For instance, worker node 120 includes an L4 pod 130 and two logical router pods 132 and 134; worker node 122 includes logical router pods 140, 142, and 144; and worker node 124 includes logical router pods 150, 152, and 154. The cluster of worker nodes 120-124, in some embodiments, collectively implement an edge device that implements multiple logical routers to handle data traffic between a logical network and an external network.

The master node 110, in some embodiments, controls and manages the worker nodes 120-124 of the cluster. In different embodiments, a cluster can include one master node or multiple master nodes, depending on the size of the cluster deployment. When multiple master nodes are included for a large cluster, these master nodes provide high-availability solutions for the cluster.

Each master node 110, in some embodiments, includes various components, such as an application programming interface (API) server used for communications to elements external to the cluster, a set of controllers to run the cluster, a state database for the cluster (e.g., Etcd), and a scheduler for scheduling pods across the worker nodes and for scheduling functionalities for worker nodes in the cluster. In some embodiments, the master node 110 executes on a first server, while the worker nodes managed by the master node 110 execute on one or more other servers.

In some embodiments, the L4 pod 130 executes a set of run-to-completion threads for processing data messages sent between the logical network and the external network and a set of control threads for handling control plane operations. Each respective run-to-completion thread executed by the L4 pod 130, in some embodiments, is assigned to a respective core of a first set of cores of a computing device on which the L4 pod 130 executes, while the set of control threads are scheduled between a second set of cores of the computing device.

Half of the available cores, in some embodiments, are allocated to these run-to-completion data message processing threads by default, with each such thread pinned to one core. All other processes and threads, in some such embodiments, are scheduled between the remaining available cores. In some embodiments, the edge appliance supports a dynamic split of CPUs between the two categories of threads, based on the actual CPU usage of both categories, and makes adjustments if needed.

In some embodiments, due to the threads executed by the L4 pod 130 being assigned to the cores of the computing device, the L4 pod 130 is affinitized to the worker node 120. Pods that are affinitized to a particular node, in some embodiments, cannot be rescheduled (i.e., moved) to a different node in the cluster. In some embodiments, other pods, such as pods that have local storage on the node and pods that are not managed by the controller, also cannot be rescheduled to other nodes. Unlike the L4 pod 130, the LR pods 132-154 (i.e., where L5-7 services are implemented) can be scheduled on any available nodes in the node pool, in some embodiments.

Apart from the L4 pod 130, each pod executing on the worker nodes 120-124 performs a set of data message processing operations for its respective logical router. These data message processing operations, in some embodiments, include L5-L7 service operations such as L7 firewall services, transport layer security (TLS) services, L7 load balancing services, uniform resource locator (URL) filtering, and domain name service (DNS) forwarding. In some embodiments, each service operation configured for at least one logical router is assigned to a separate pod (i.e., rather than the logical router being a single pod that collectively performs each of the service operations).

Some embodiments use exactly one pod per logical router, e.g., each logical router has a dedicated pod, which may require multiple service daemons running in each pod (i.e., each service daemon performing a service configured for the logical router). Different daemons can be put into separate containers or the same one, according to some embodiments. Alternatively, some embodiments use one pod per network function or service of a logical router (e.g., each service daemon running in the same pod). This arrangement works well for, e.g., an Autonomous Edge that includes a single logical router with many services. A logical router may be defined to include a distributed router and one or more centralized routers. In some embodiments, the separate pods for such a logical router includes a pod for the distributed router and additional pods for each of the centralized routers.

The L4 pod 130, in some embodiments, performs its own respective set of data message processing operations for all of the logical routers. The set of data processing operations performed by the L4 pod 130 for multiple logical routers, in some embodiments, includes layer 2-layer 4 (L2-L4) operations, such as L2/L3 lookups, tunnel termination/encapsulation, firewall processing, packet updating, and byte counters. This can include logical network processing, such as logical switching and logical routing operations.

Figure 2:
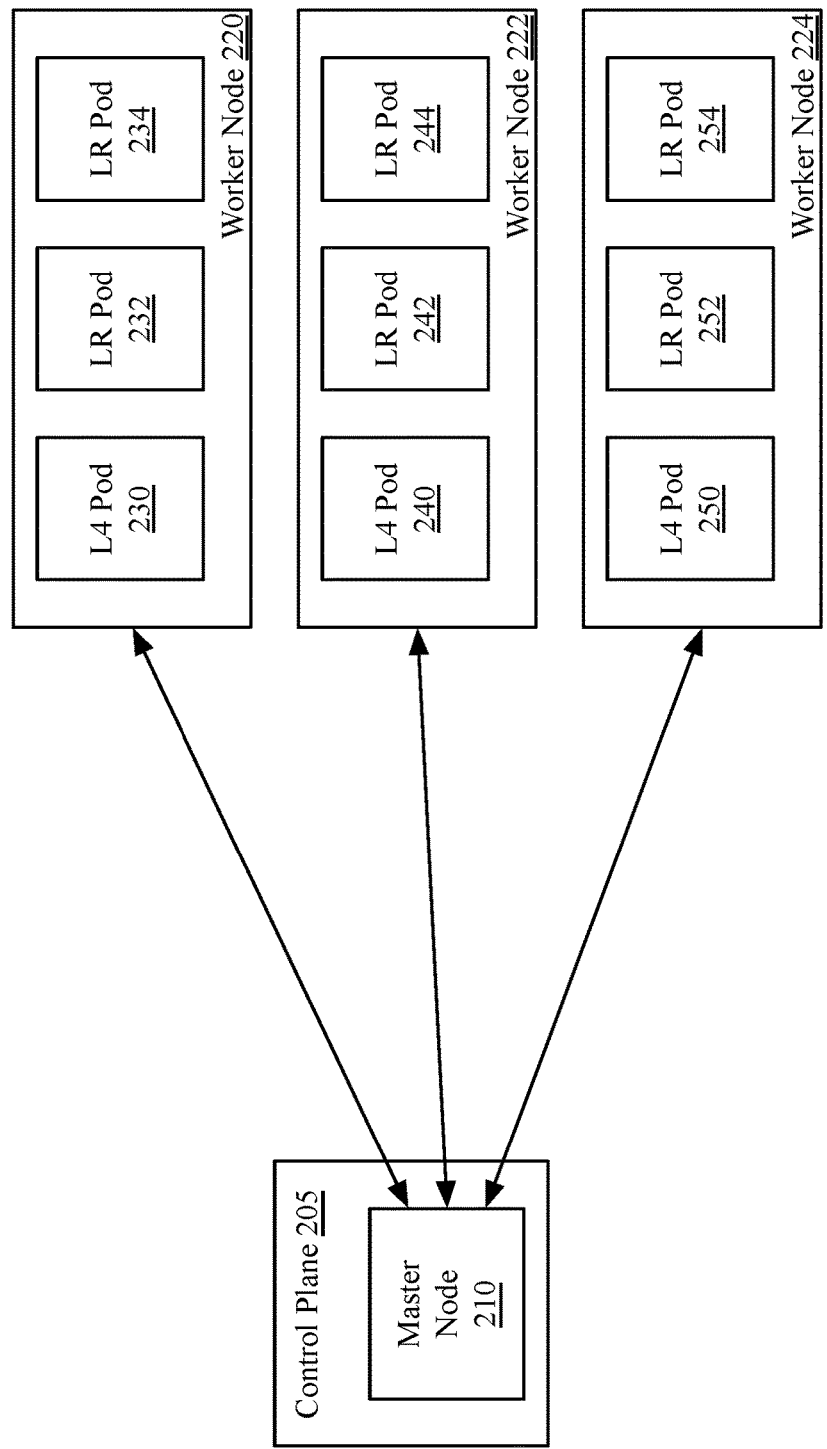
FIG. 2 illustrates an overview of an edge architecture in which a Kubernetes cluster, that includes one L4 pod per worker node, implements an edge device, in some embodiments.

Instead of having a single L4 pod on one worker node, some embodiments instantiate an L4 pod on each worker node. FIG. 2 illustrates an overview of such an edge architecture 200 in which a Kubernetes cluster, that includes one L4 pod per worker node, implements an edge device, in some embodiments. The Kubernetes cluster in the edge architecture 200 includes a master node 210 that runs on the control plane 205, and a set of worker nodes 220, 222, and 224.

Unlike in the edge architecture 100, the L4 pod in the edge architecture 200 is implemented as a daemonset on all worker nodes. For example, each worker node 220-224 in the edge architecture 200 executes a respective L4 pod 230, 240, and 250. Additionally, the worker node 220 executes logical router pods 232 and 234, the worker node 222 executes logical router pods 242 and 244, and the worker node 224 executes logical router pods 252 and 254. In some embodiments, the edge architecture 200 uses a high-availability implementation (e.g., all of the L4 pods can be active with ECMP routing supported or one of the L4 pods is designated as active and the other L4 pods are designated as standby).

With this discussion of the architecture of a Kubernetes-based edge device introduced, the basic operation of an edge device (also referred to as an edge node) will now be described. A typical edge node implemented either as a bare metal device or VM has fixed CPU and memory. In some embodiments, hugepage memory that includes half of the total available memory is reserved by default for data message processing user space drives, configuration databases, connection tables, etc. Each edge node, in some embodiments, can run multiple components belonging to a variety of component classes.

The components classes, in some embodiments, include fastpath, control path, services, and other. The fastpath class includes poll mode driver (PMD) threads that are pinned to specific processing cores and run the service pipeline in a run-to-completion model. In some embodiments, the services that are implemented this way include switching, routing, network address translation (NAT), firewall, IPsec (internet protocol security), etc. The control path class, in some embodiments, includes datapath slowpath (e.g., address replacement protocol (ARP) learning, MAC learning, bi-directional forwarding detection (BFD) finite state machine (FSM), firewall purging, etc.), dynamic routing daemon (e.g., free-range routing (FRR)) and its related components (e.g., RCPM, etc.), internet key exchange (iked) (e.g., IPsec control plane), edge-agent, ops-agent, nsx-proxy, nestdb, exporter, aggsvc, nsd, etc. The services class of some embodiments includes services such as L7 firewall, TLS proxy, L7 LB, URL filtering, DNS forwarder, etc. Lastly, the remaining class includes KNI kthread, HCX, etc., in some embodiments.

In some embodiments, the max packet rate that can be achieved with stateful L4 services, such as firewall and NAT, is 1M PPS per core. To handle 100 Gbps throughout with 64 B bytes, some embodiments require the edge node to handle 148M PPS. For pure routing, this would require approximately 24 cores (i.e., assuming linear scalability), and for stateful firewall, this would require 148 cores.

Data message processing at the edge includes multiple steps in some embodiments, such as L2/L3 lookups, tunnel termination/encapsulation, firewall processing, updating the data message and byte counters, as mentioned above. In many cases, the data message processing includes various combinations of these steps, with each step having the potential to be repeated several times. As such, every data message processed translates to a large number of memory accesses as various data structures (e.g., routing tables, configurations, etc.) are consulted to determine forwarding decisions. To alleviate potential issues caused by the large number of memory accesses (e.g., exceeding the capacity of CPU L1/L2/L3 caches, low CPU cache hit rates, low performance, etc.), the edge datapath in some embodiments implements a flow cache.

In some embodiments, the processing of a received data message by the datapath message processing thread is reduced to a match-action table lookup, as well as data message modification based on the actions recorded. Anything that can be accelerated by the pNIC/vNIC, in some embodiments, will be offloaded, such as stateless checksum, Large Segmentation Offload (LSO), Large Receive Offload (LRO), Receive Side Scaling (RSS), VLAN insertion/stripping, flow director, and UDP Segmentation Offload (USO).

Kernel NIC Interfaces (KNI) allow DPDK applications (e.g., the edge datapath) to pass data messages between user space applications and a kernel network stack. KNIs are faster than TUN/TAP interfaces by eliminating system calls and copy to/from user operations (i.e., they are zero-copy). These KNIs were originally designed for control path communications but have been repurposed to carry datapath messages (e.g., L2 Ethernet frames). For these datapath messages, multi-queue support, VLAN and checksum offload, and other optimizations can be added. However, performance (e.g., HTTP throughput) using KNIs is still limited in some cases. In addition, the use of KNIs involves various efforts to keep an out-of-tree kernel module up with regularly changing API/ABI. To support various hardware offload operations (e.g., VLAN, checksum, TLS offload, etc.), extra metadata tagged at the PNIC is carried with the data messages.

In order to scale out software networking appliances, some embodiments support a multi-node cluster. Rather than an edge device being a fixed appliance with fixed capabilities, the functions are broken down into micro-services. This multi-node cluster, in some embodiments, allows services to be scaled out across nodes. In some embodiments, active/active mode is supported for stateful services to improve the service scale-out performance. For instance, a cluster of Kubernetes edge nodes can be formed to offer such redundancy and scaling and can also use nodes provisioned for a conventional cluster. In some embodiments, this requires the networking fabric to support equal-cost multipath (ECMP) routing.

Figure 3:
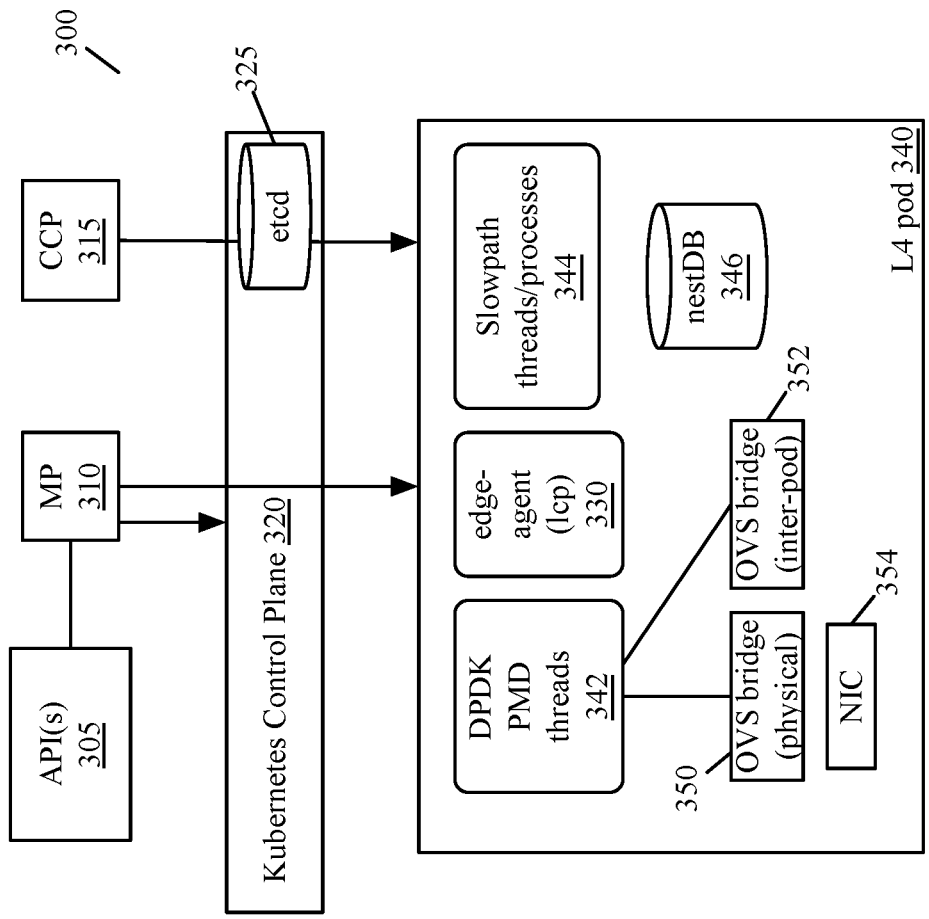
FIG. 3 illustrates an architectural overview of a control plane of some embodiments.

FIG. 3 illustrates an architectural overview of a control plane 300 of some embodiments. The control plane 300 includes API(s) 305, management plane 310, central control plane 315, Kubernetes control plane 320, and a local control plane edge agent 330 executing on an L4 pod 340. The API(s) 305, in some embodiments, enable an administrator to communicate with the management plane 310 to configure the edge (as well as other logical network aspects). As shown, the L4 pod 340 includes DPDK PMD threads 342 (i.e., fastpath data message processing threads), slowpath threads and processes 344, and a database (e.g., nestDB) 346. The DPDK PMD threads 342 are connected to a physical OVS bridge 350 that connects to a NIC 354, as well as to an inter-pod OVS bridge 352. In other embodiments, the DPDK PMD threads 342 connect directly to the NIC 354 (i.e., without an OVS bridge or any other virtual switch in between).

The management plane 310, in some embodiments, receives and accepts requests (e.g., resource and object requests from an administrator) via the API(s) 305. As shown, the management plane 310 connects to both the Kubernetes control plane 320 and the L4 pod 340. The management plane 310 is responsible for managing pod lifecycles directly over the Kubernetes control plane 320.

The central control plane 315 also connects to the L4 pod 340 over the Kubernetes control plane 320. In some embodiments, the central control plane 315 is responsible for configuring logical networks and forwarding rules over the local control plane edge agent 330. In some embodiments, the central control plane 315 is configured to perform other configurations over the local control plane in addition to logical network and forwarding rule configurations. For example, in some embodiments, configurations for the L4 pod 340 are pushed down from the central control plane 315 to the nestDB 346 for use by the local control plane agent 330.

The Kubernetes control plane 320 includes a cluster state database 325 (e.g., etcd). While not shown, the Kubernetes control plane 320 in some embodiments includes an API server. This API server, in some embodiments, is a frontend to a Kubernetes cluster for all communications external to the cluster. In some embodiments, when a logical router is added to or deleted from the cluster, a corresponding logical router pod is also created or deleted. Additionally, when such logical routers are added or deleted, inter-pod bridges, such as the OVS bridge 352 of the L4 pod 340, are created or removed.

Kubernetes support Cluster Autoscaler, Vertical Pod Autoscaler (VPA), and Horizontal Pod Autoscaler (HPA). In some embodiments, the Cluster Autoscaler allows one edge node to scale seamlessly to more nodes when demands for more CPU come and go, according to some embodiments. The VPA, in some embodiments, is a set of one or more vertical autoscaler pods that run as control plane processes. In some embodiments, the VPA provides recommendations for values and limits on resource requests and determines whether to modify the amount of resources available for another pod. These recommendations, in some embodiments, are based on size constraints (i.e., minimum and maximum size constraints) specified for a node pool. In some embodiments, a separate HPA exists on the control plane for each logical router, with each HPA performing autoscaling operations to increase or decrease the number of pods for its respective logical router based on a variety of metrics. These metrics, in some embodiments, include actual resource usage, custom metrics reported by other Kubernetes objects in the cluster, and external metrics from applications and services external to the cluster.

Additionally, logical router pods could also benefit from VPA and (if none of the services configured for the logical router are stateful services) HPA. When stateful services are enabled, the use of HPA to increase the number of pods for a logical router may be difficult because many stateful services require traffic from both directions to arrive on the same pod.

Figure 4:
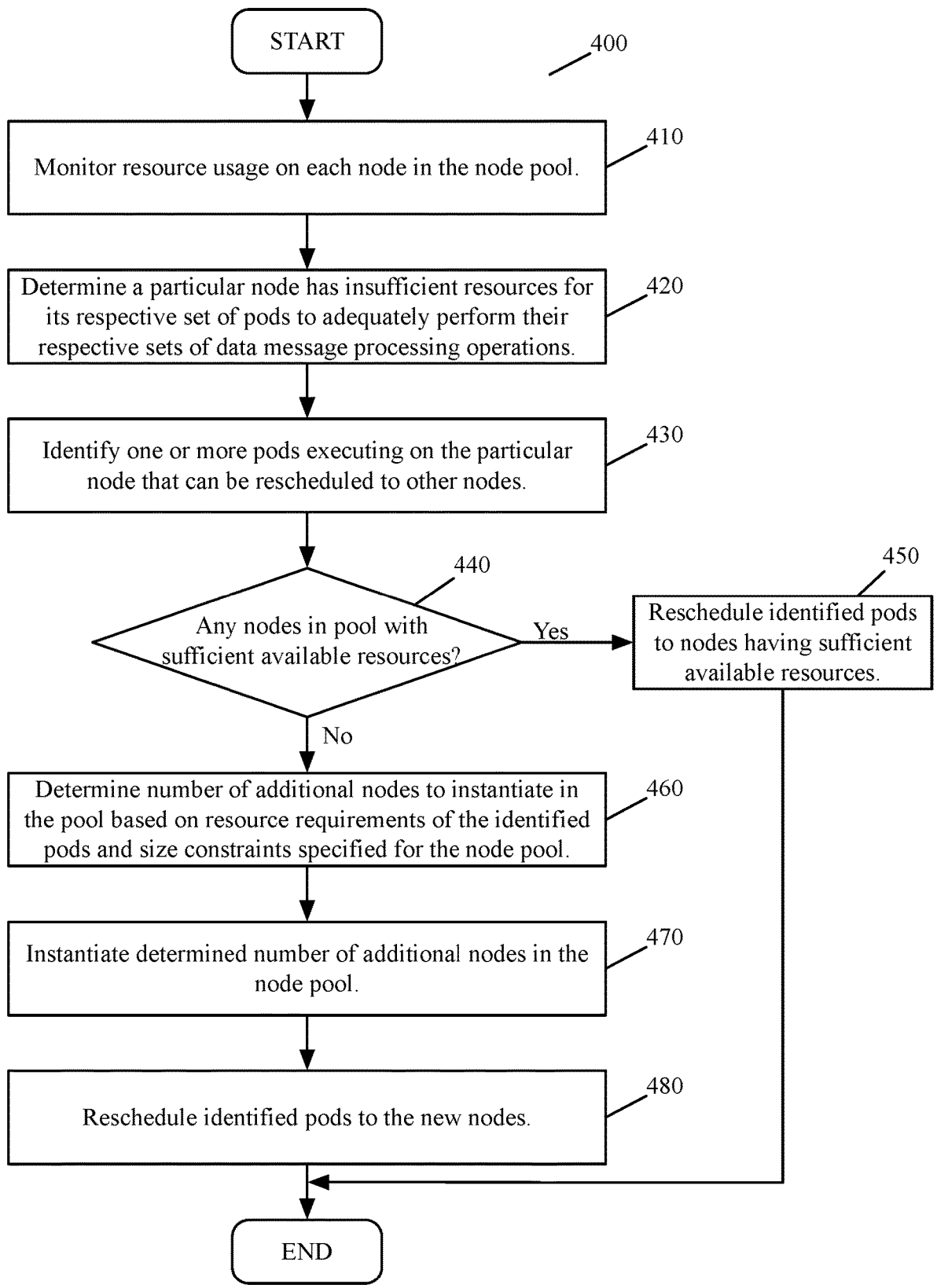
FIG. 4 conceptually illustrates a process for using cluster autoscaling to increase the number of nodes in a node pool, in some embodiments.

FIG. 4 illustrates a process 400 for using cluster autoscaling to increase the number of nodes in a node pool, in some embodiments. The process 400 is performed, in some embodiments, by a cluster autoscaler that runs in the master node (i.e., as part of the control plane for the edge device). As mentioned above, Kubernetes supports cluster autoscaler, VPA, and HPA. In some embodiments, the cluster autoscaler of the process 400 works in conjunction with a VPA and/or an HPA during its autoscaling operations.

The process 400 starts by monitoring (at 410) resource usage on each node in the node pool. Rather than monitor resource usage by monitoring resource utilization, the cluster autoscaler monitors resource usage according to resource requests by pods executing on the nodes. In the edge architecture 100, for instance, a cluster autoscaler (not shown) running on the master node 110 would monitor resource usage by the pods 130-134, 140-144, and 150-154 on each of the worker nodes 120-124, respectively. The resources for which the cluster autoscaler monitors the resource requests for include at least CPU and memory in some embodiments.

The process determines (at 420) that a particular node in the node pool has insufficient resources for its respective set of pods to adequately perform their respective sets of data message processing operations. The cluster autoscaler makes this determination, in some embodiments, based on determining that one or more pods have reached a specified limit of resource requests. Any number of the pods operating on a node may be affected by the insufficient amount of resources (e.g., all of the pods, a single pod, or a subset of the pods). For instance, a particular logical router pod may experience resource shortages due to a large influx of data traffic.

The process identifies (at 430) one or more pods executing on the particular node that can be rescheduled to other nodes in the node pool. As described above, pods that are affinitized to the node, pods that have local storage on the node, and pods that are not managed by the controller, in some embodiments, cannot be rescheduled to other nodes. For instance, the L4 pod 130 that executes on the worker node 120 is affinitized to that worker node and would not generally be available to be rescheduled to a different node.

The process determines (at 440) whether any nodes in the node pool have sufficient available resources to support one or more of the pods from the particular node. In some embodiments, for example, one or more nodes in the node pool may have available resources that have not been allocated to any pods yet, or may have underutilized resources that can be reallocated to new or rescheduled pods. When the process determines (at 440) that there are nodes in the node pool that have sufficient resources to support one or more of the pods from the particular node, the process reschedules (at 450) the identified pods to the nodes determined to have sufficient available resources. The process 400 then ends.

Otherwise, when the process determines (at 440) that there are not any nodes in the node pool with sufficient available resources to support one or more of the pods from the particular node, the process determines (at 460) a number of additional nodes to instantiate in the node pool based on resource requirements of the identified pods as well as size constraints (i.e., a maximum number of nodes) specified for the node pool. In some embodiments, when configuring the node pool and the cluster autoscaler, a user (e.g., network administrator) specifies a minimum size for the node pool and a maximum size for the node pool, and the cluster autoscaler automatically adjusts the number of nodes in the node pool as needed within the constraints of the specified minimum and maximum.

Figure 5:
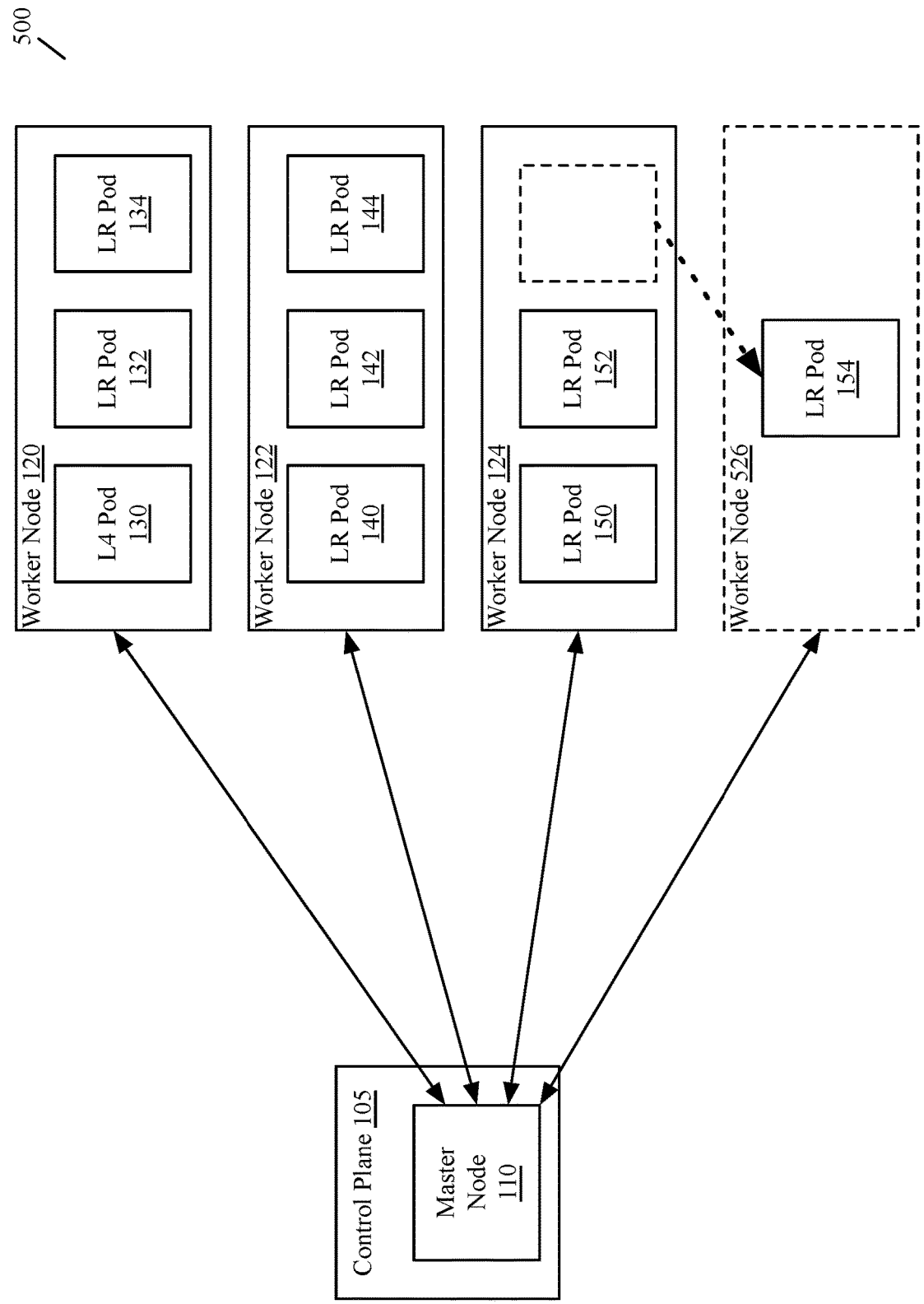
FIG. 5 illustrates an updated overview of the edge architecture of FIG. 1.

The process instantiates (at 470) the determined number of additional nodes in the node pool. As mentioned above, each node in node pool has the same configuration, and, as such, the additional nodes instantiated in the node pool will also have the same configuration as each other existing node in the pool. FIG. 5 illustrates an updated overview 500 of the edge architecture described above for FIG. 1. As shown, the updated architecture 500 includes an additional worker node 526.

The process then reschedules (at 480) the identified pods to the newly instantiated nodes. In the updated edge architecture 500, for example, the logical router pod 154 has been removed from the worker node 124 and rescheduled to the newly instantiated worker node 526. In some embodiments, after the pod or pods have been rescheduled, a VPA performs an additional autoscaling operation to increase the amount of resources allocated to the remaining pods on the worker node 124 and/or to increase the amount of resources allocated to the rescheduled pod 154 on the new node 526. Following 480, the process 400 ends.

Figure 6:
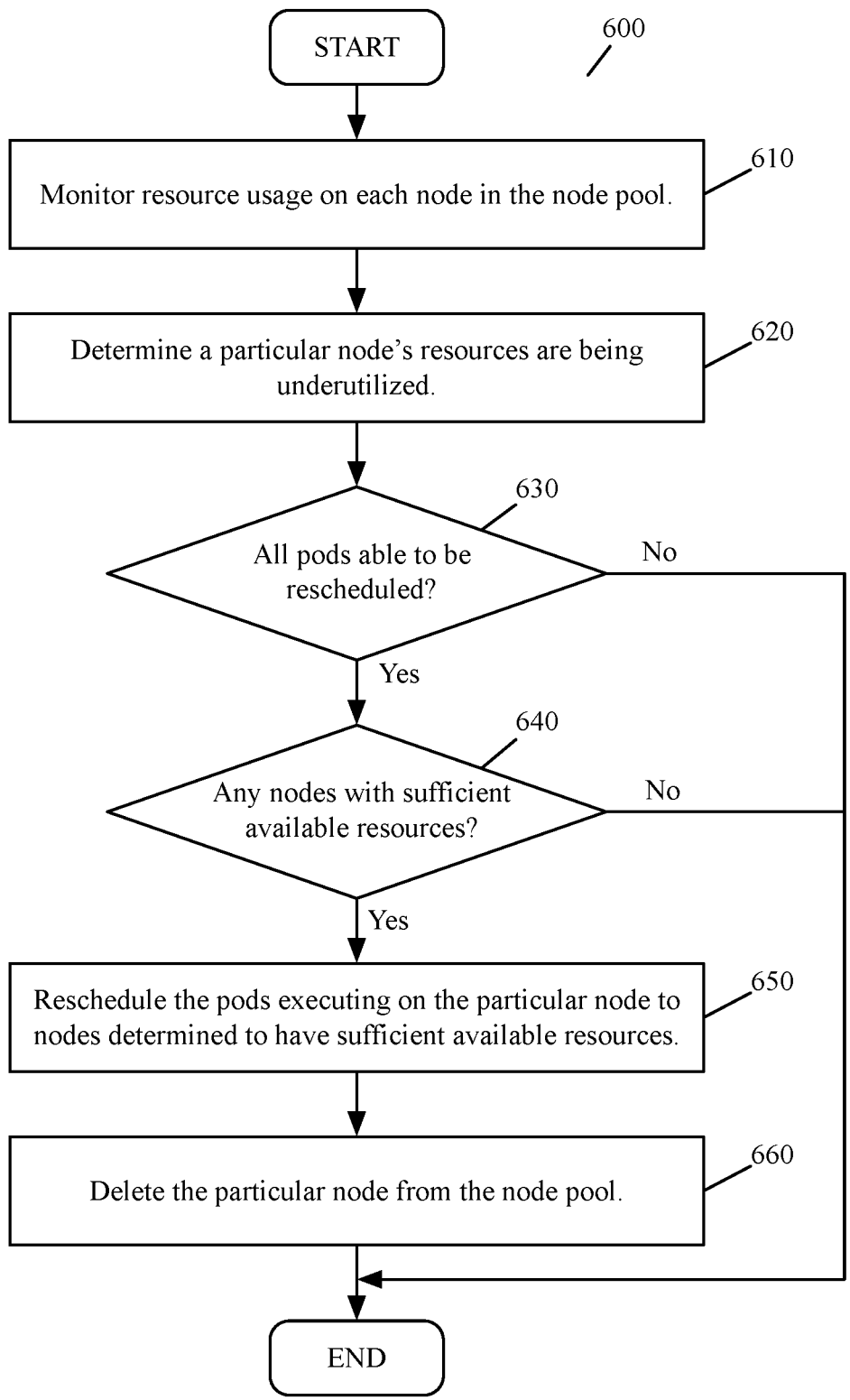
FIG. 6 conceptually illustrates a process for using cluster autoscaling to decrease the number of nodes in a node pool, in some embodiments.

FIG. 6 illustrates a process 600 for using cluster autoscaling to decrease the number of nodes in a node pool, in some embodiments. Like the process 400, the process 600 is performed, in some embodiments, by a cluster autoscaler that runs in the master node (i.e., as part of the control plane). The process 600 starts by monitoring (at 610) resource usage on each node in the node pool. As described above, the cluster autoscaler monitors resource usage by monitoring the number of resource requests made by pods on each of the nodes in the node pool.

The process determines (at 620) that a particular node's resources are being underutilized by the pods executing on the particular node. In some embodiments, this determination is based on a lack of resource requests by the pods executing on the particular node. For instance, when data traffic processing is distributed across multiple logical router pods that are distributed across multiple nodes in a pool, each logical router pod may have a small amount of data traffic to process when there are a lot of other logical router pods. As a result, some nodes may have underutilized resources, and consolidating the pods to fewer nodes would result in more efficient use of the nodes' resources.

The process determines (at 630) whether all of the pods executing on the particular node can be rescheduled. Pods that are affinitized to a particular node, pods that have local storage on a particular node, and pods that are not managed by the controller, in some embodiments, are pods that cannot be rescheduled to other nodes. For instance, in the edge architecture 100, the L4 pod 130 is affinitized to the worker node 120 and cannot be rescheduled. As a result, the worker node 120 cannot be deleted without deleting the L4 pod 130.

When the process 600 determines (at 630) that one or more pods executing on the particular node cannot be rescheduled, the process 600 ends.

Alternatively, when the process determines (at 630) that all pods executing on the particular node can be rescheduled, the process determines (at 640) whether there are any other nodes in the node pool that have sufficient available resources to adequately support the data messaging processing operations of the pods from the particular node. For instance, in some embodiments, the process 600 may determine at 620 that more than one particular node's resources are being underutilized, and thus the pods that execute on each of the nodes can be consolidated on fewer nodes. When there are no other nodes in the pool that have sufficient available resources, the process 600 ends.

Alternatively, when the process determines (at 640) that there are available nodes in the pool that have sufficient available resources, the process transitions to 650 to reschedule the pods executing on the particular node to the other nodes determined to have sufficient available resources to support the data message processing operations of the particular node's pods.

Figure 7:
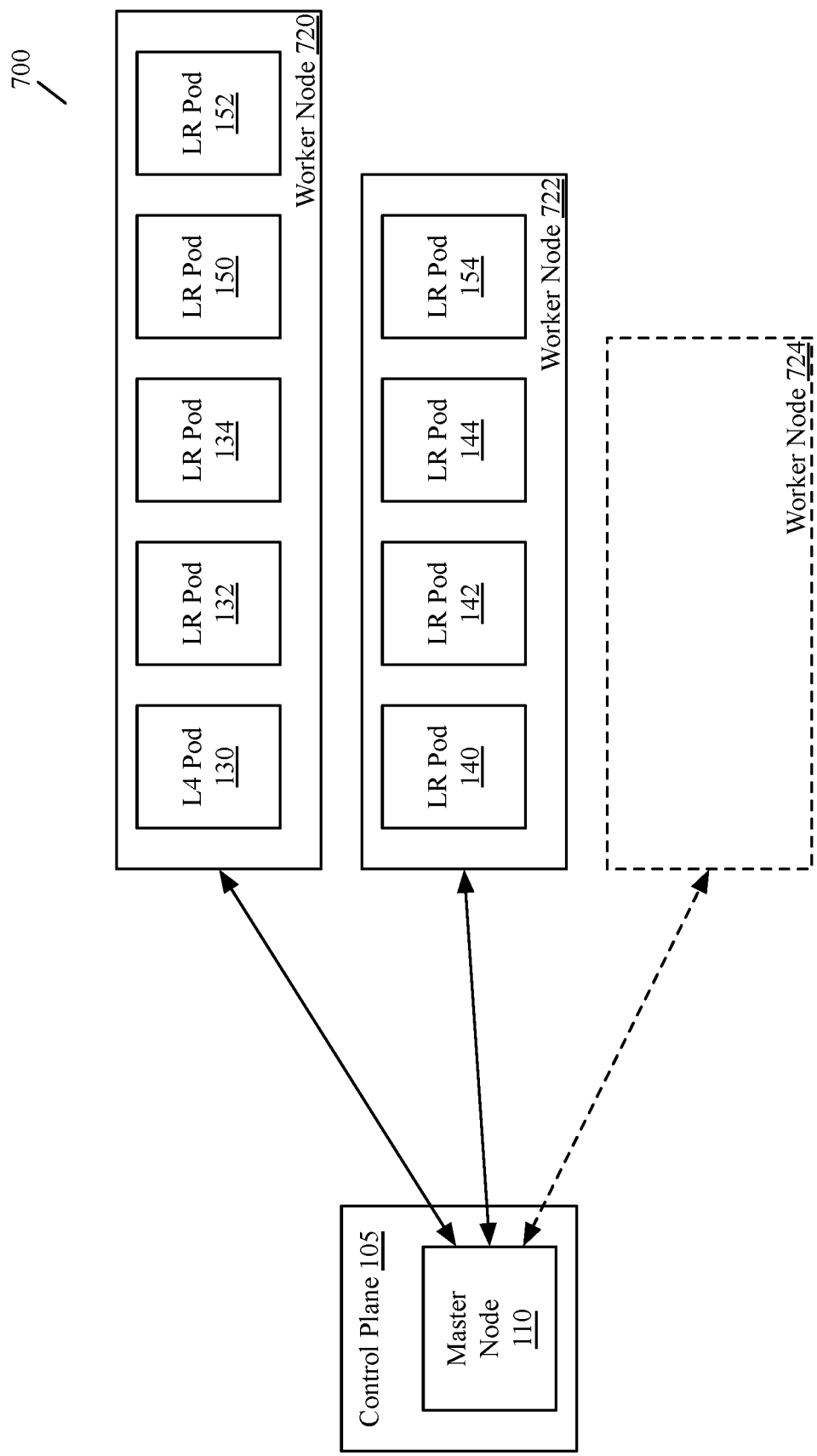
FIG. 7 illustrates another updated overview of the edge architecture of FIG. 1.

FIG. 7, for example, illustrates an updated overview 700 of the edge architecture described above for FIG. 1. The logical router pods 150-154 previously executed on the worker node 124 in the edge architecture 100 and have been rescheduled across the other nodes. As shown, updated worker node 720 now executes L4 pod 130, and logical router pods 132, 134, 150, and 152, while updated worker node 722 now executes logical router pods 140, 142, 144, and 154.

Returning to the process 600, the process then deletes (at 660) the particular node from the node pool. For instance, the worker node 724 in the edge architecture 700 no longer executes any pods and is illustrated with a dashed outline to indicate its deletion from the cluster. Following the deletion of the particular node at 660, the process 600 ends.

In Kubernetes, networking functions are often delegated to network plugins referred to as container network interfaces (CNIs). These CNIs often at least implement a standard CNI API to provide basic networking to containers. Typically, multiple networking interfaces are used for a network function virtualization (NFV) or software-defined networking (SDN) virtual appliance, such as the edge appliance, for separation of control between management and data planes (e.g., multi-home pod, etc.) By default, a pod has only one network interface apart from a loopback interface. Some networking use cases may require multiple interfaces connected to each pod, or interfaces of different types. Multus-CNI is one example of such a CNI that allows multiple network interfaces in one pod. Multus-CNI is a meta CNI plugin that uses other CNI plugins for network attachment definitions. Other than the management NIC (often referred to as eth0), multus-CNI is commonly used to create high performance interfaces for pods performing networking functions to support more complex networking usages.

Figure 8:
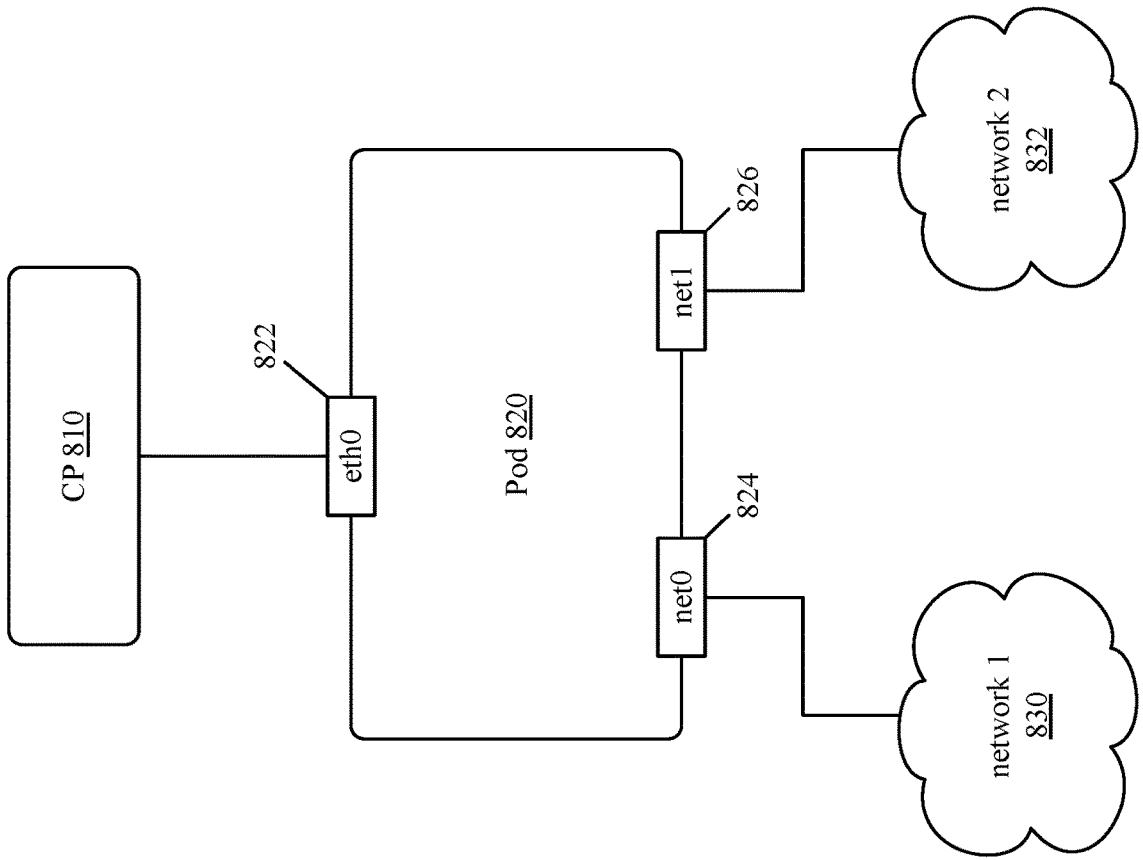
FIG. 8 illustrates a multi-homed pod with multus, according to some embodiments.

FIG. 8 illustrates a simplified example of a multi-homed pod that uses multus-CNI, according to some embodiments. As shown, this figure includes a pod 820 that has an interface 822 to a control plane 810, an interface 824 to a first external network 830, and an interface 826 to a second external network 832. The pod 820, in some embodiments, can be an L4 pod or a logical router pod. In some embodiments, multiple pods each having more than one interface to external networks may execute on the same worker node.

Figure 9:
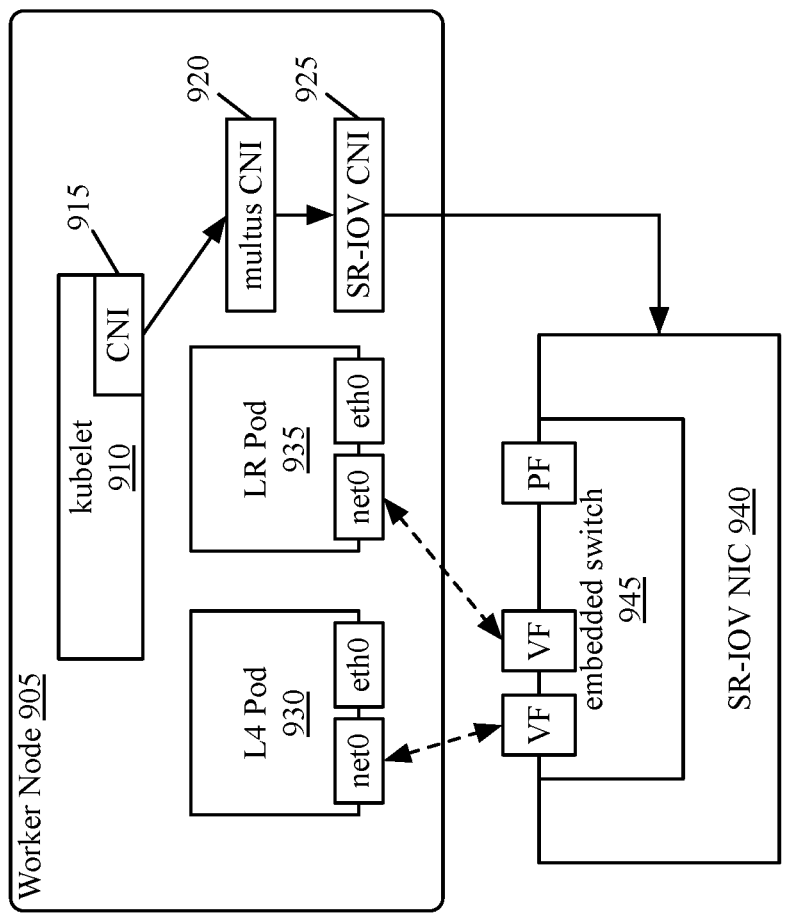
FIG. 9 illustrates an embedded switch on the NIC being used to accelerate inter-pod networking, in some embodiments.

The Kubernetes single root I/O virtualization (SR-IOV) network device plug-in, in some embodiments, extends the capabilities of Kubernetes to address high-performance network I/O by first discovering, and then advertising, SR-IOV network virtual functions (VFs) on a Kubernetes host. FIG. 9 illustrates an embedded switch on the NIC being used to accelerate inter-pod networking, in some embodiments. This approach allows close-to-line rate processing by the NIC, according to some embodiments.

This figure shows a worker node 905 and an SR-IOV NIC 940. The worker node 905 executes a kubelet 910, a multus CNI 920, an SR-IOV CNI 925, an L4 pod 930, and a logical router pod 935. Additionally, the kubelet 910 includes a CNI 915, while each of the pods 930-935 include respective network interfaces, and interfaces to the control plane. The SR-IOV NIC 940 includes an embedded switch 945 on which a set of VFs run.

The SR-IOV CNI 925 allows a single physical PCI resource to be partitioned into virtual PCI functions for allocation to application and network function pods, in some embodiments. As illustrated by the dashed lines between the network interfaces of the pods 930-935 and the VFs of the embedded switch 945, the SR-IOV CNI 925 enables the pods to be directly attached to VFs by using a standard driver in the kernel of a container's host.

The SR-IOV CNI 925, in some embodiments, works with both VFs in kernel drivers as well as in DPDK drivers. In some embodiments, the SR-IOV CNI 925 can be used to configure VFs in the pods 930-935 when the VFs are attached to kernel drivers, whereas a virtual network function (VNF) application is responsible for configuring the VFs when the VFs are attached using DPDK drivers, according to some embodiments.

In some embodiments, a split datapath is implemented for edge appliances that allows L2-L4 services to be offloaded to a Smart NIC (i.e., when one is available) as a new fastpath (e.g., offloaded by the L4 pod or with the smart NIC replacing the L4 pod), while also enabling more elastic and scalable L7 services. By offloading L2-L4 services to a Smart NIC, some embodiments achieve better performance and save on CPU costs. In some embodiments, a new memif (shared memory packet interface) device is implemented in open vSwitch (OVS). This new memif device allows for leveraging of a high-performance virtual interface (VIF) for inter-pod networking, while replacing the kernel network interface (KNI).

Figure 10:
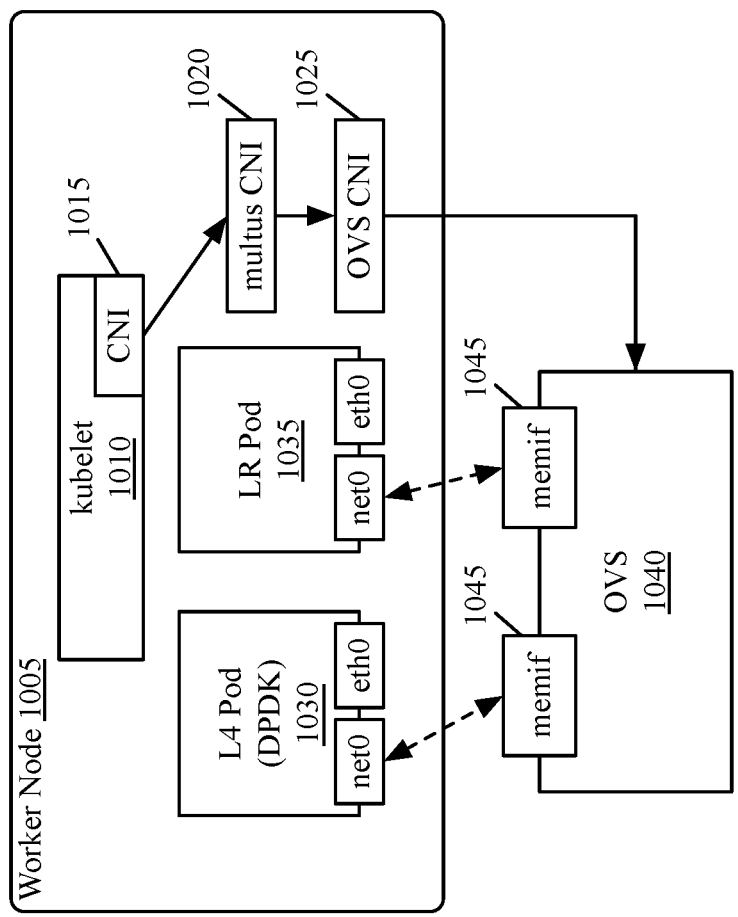
FIG. 10 illustrates the use of memif on a Kubernetes edge appliance for inter-pod networking between pods on the same worker node, in some embodiments.

FIG. 10 illustrates the use of memif on a Kubernetes edge appliance for inter-pod networking between pods on the same worker node, in some embodiments. This figure shows a worker node 1005 and an Open vSwitch (OVS) 1040. The worker node 1005 executes a kubelet 1010, a multus CNI 1020, an OVS VNI 1025, an L4 pod with a DPDK driver 1030, and a logical router pod 1035. The kubelet 1010 also includes a CNI 1015, while each of the pods 1030-1035 include respective network interfaces and control plane interfaces. The OVS 1040 includes a pair of memifs 1045.

Each pod 1030-1035 executing on the worker node 1005 is connected to OVS 1040 via a respective memif 1045, as illustrated. The memif devices 1045 allow containers running in the pods 1030-1035 to be connected together at the speed of the memory bus, according to some embodiments. By default, each pod in a Kubernetes edge appliance is connected to an OVS via one memif interface in some embodiments.

In some embodiments, the memifs 1045 use libmemif from vector packet processing (VPP) and can be leveraged (e.g., with Ligato) to enable rapid development of high-performance cloud-native VNFs. A new network type, netdev-memif, is implemented on top of OVS, in some embodiments, to support the memif device. In some embodiments, performance with a memif device can achieve higher than 10M PPS.

Figure 11:
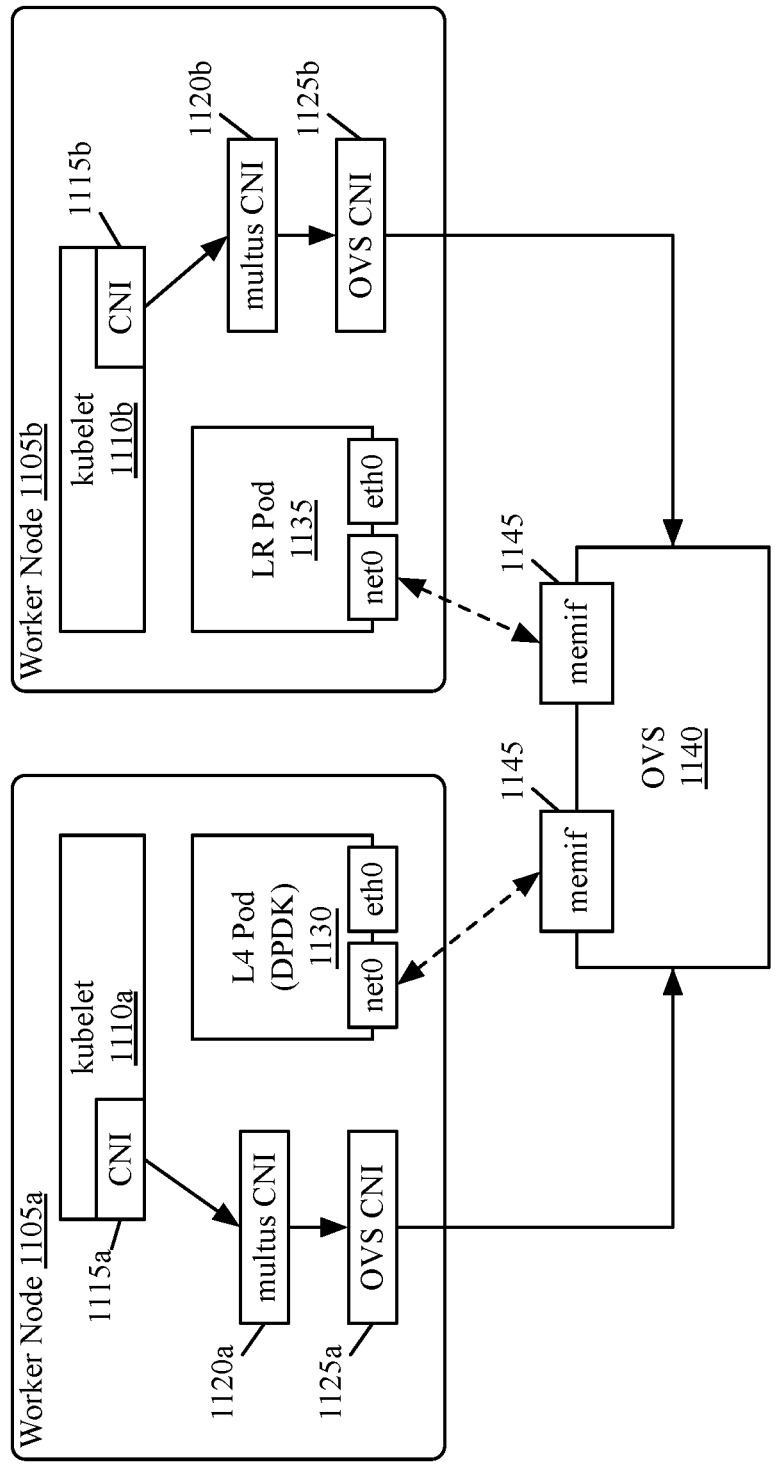
FIG. 11 illustrates the use of memif on a Kubernetes edge appliance for inter-pod networking between pods on different worker nodes, in some embodiments.

FIG. 11 illustrates the use of memif on a Kubernetes edge appliance for inter-pod networking between pods on different worker nodes, in some embodiments. This figure shows worker nodes 1105a and 1105b, and an OVS 1140 for facilitating inter-pod networking for pods running on each of the worker nodes 1105a and 1105b. While the switch is illustrated as an OVS, which provides high performance for DPDK mode, some embodiments use other switches that offer similar functionality, such as a Linux bridge.

Each of the worker nodes 1105a and 1105b includes a respective kubelet 1110a and 1110b each having a respective CNI 1115a and 1115b, a respective multus CNI 1120a and 1120b, and a respective OVS CNI 1125a and 1125b. Additionally, the worker node 1105a executes an L4 pod 1130 with DPDK, and the worker node 1105b executes a logical router pod 1135. The L4 pod 1130 executing on the worker node 1105a and the logical router pod 1135 executing on the worker node 1105b connects to a respective memif 1145 of the OVS 1140, as shown.

In some embodiments, resource plugins other than OVS CNI are utilized for tunnel interfaces for worker nodes, and forwarding rules can be programmed accordingly. For example, a forwarding rule for inter-pod forwarding between the L4 pod 1130 and the logical router pod 1135 on the worker nodes 1105a and 1105b may specify a tunnel port for forwarding to a destination MAC address. Conversely, a forwarding rule for the L4 pod 1030 and the logical router pod 1035 on the worker node 1005 may specify a port for forwarding to a destination MAC address. These forwarding rules are pushed down from a network controller, in some embodiments.

A destination MAC address is assigned to an interface of the logical router pod 1135 that's attached to the OVS 1140 based on assignments provided by a network manager (e.g., NSX-T manager), in some embodiments. Such network interfaces, in some embodiments, are not visible to the pod network and are only used for inner-pod networking controlled by the network manager.

While the pure software approach with memif may not be as performant as the SR-IOV based approach in some cases, in an environment where device passthrough is not possible (e.g., such as some cloud environments), it provides a viable solution. However, in some embodiments, the socket application needs to be rewritten to call into the APIs provided by the device (a common tradeoff faced by such high-performance networking software solutions). When applied to an autonomous edge, it can be made to work with any Kubernetes environment with improved availability and scalability.

Smart NICs, in some embodiments, can be utilized for offloading and accelerating a range of networking datapath functions from the host CPU. These Smart NICs also offer more programmable network processing features and intelligence compared to a traditional NIC, according to some embodiments. Some common datapath functions supported by Smart NIC include multiple match-action processing, tunnel termination and origination, etc. The match-action table works very similarly with flow cache and can be offloaded with relatively small efforts, in some embodiments.

In some embodiments, it is relatively easy to achieve inter-pod networking with VF approach as the NIC already supports switching between VFs on the same embedded switch. For the memif approach, in some embodiments, OVS can be offloaded to a NIC ASIC's (e.g., CX6) match-action table for some relatively simple pipelines. In some such embodiments, the last action is to send to a destination memif on the same switch. Since the hardware does not understand memif, CPU needs to be involved to continue the remaining work to copy packets to the destination memif, in some embodiments. This work, in some embodiments, can be further offloaded to the NIC if it supports virtio datapath acceleration (vDPA). For example, vDPA offloads virtio datapath to the NIC and offers line-speed networking performance.

Figure 12:
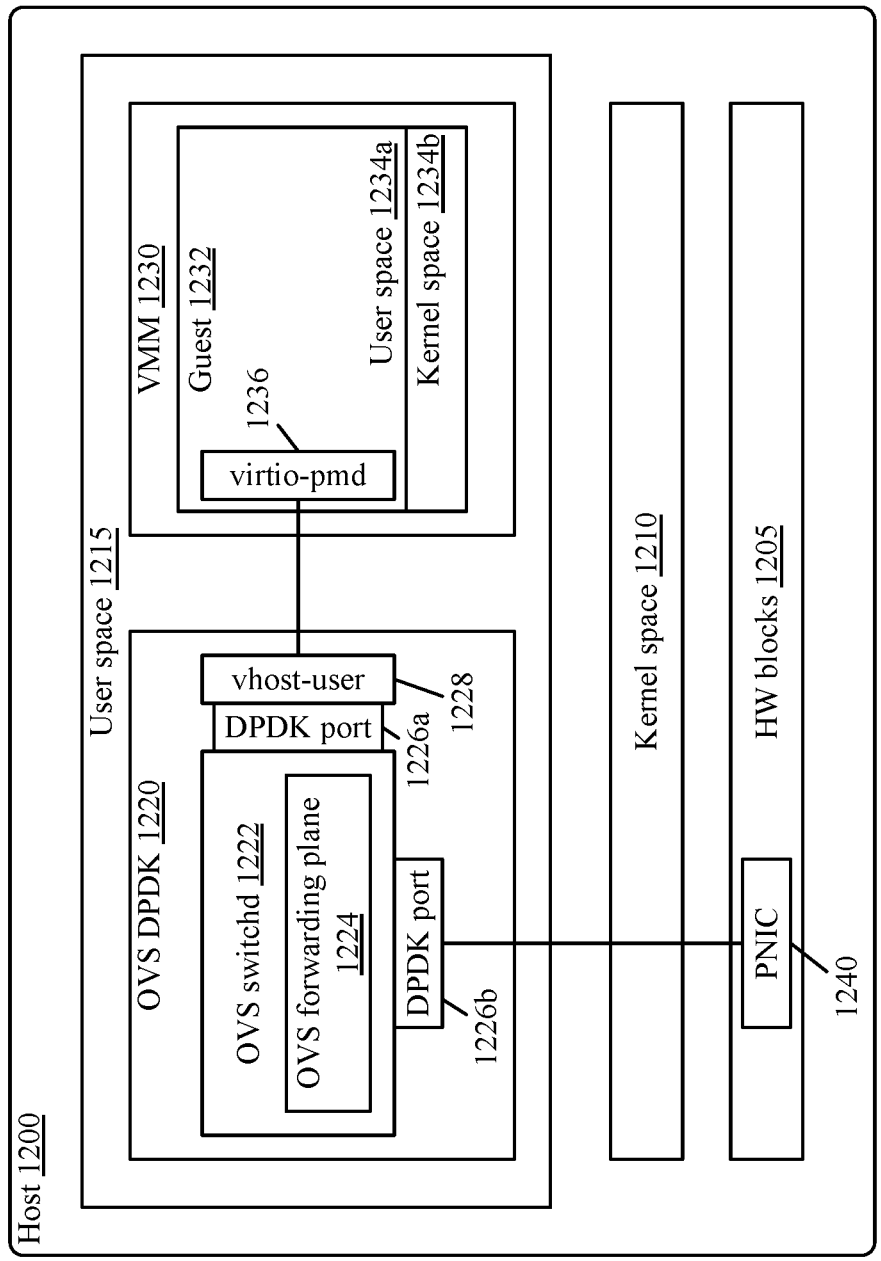
FIG. 12 illustrates a virtio implementation on a host, according to some embodiments.

In some embodiments, virtio is implemented on hosts as an alternative to both KNI and memif FIG. 12, for example, illustrates a virtio implementation on a host 1200 of some embodiments. As shown, the host 1200 includes hardware (HW) blocks 1205, a host kernel space 1210, and a host user space 1215. The host user space 1215 includes an OVS DPDK 1220 and a virtual machine monitor (VMM) 1230. In some embodiments, the VMM 1230 is a generic, open source machine emulator such as QEMU.

The OVS DPDK 1220 enables usage of a DPDK-optimized virtual host (vhost) path in OVS. For example, the OVS switchd 1222 runs on the OVS DPDK 1220 and includes an OVS forwarding plane 1224. The OVS switchd 1222 also includes a DPDK port 1226a that connects to a PNIC 1240 of the HW blocks 1205, and a DPDK port 1226b to which a vhost-user interface 1228 is attached. The vhost-user interface 1228, in some embodiments, is a module that includes additional APIs inside the DPDK library.

The VMM 1230 executes a guest machine 1232 that includes a user space 1234a and a kernel space 1234b. A virtio-PMD interface 1236 executes within the user space 1234a of the guest machine 1232, as shown. The virtio-PMD interface 1236 is a poll mode driver that consumes dedicated cores and performs polling without any interruptions, according to some embodiments.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
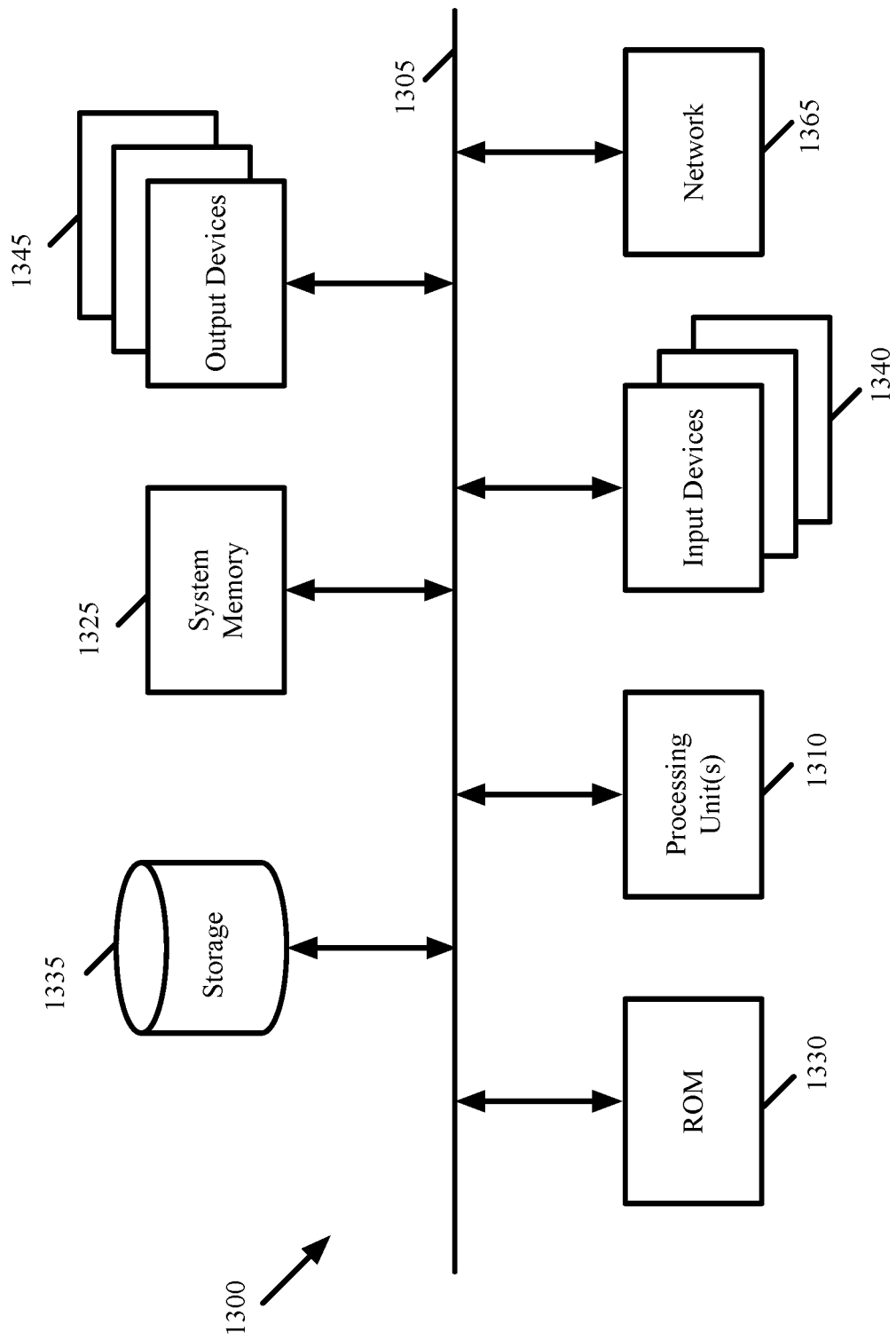
FIG. 13 conceptually illustrates a computer system with which some embodiments of the invention are implemented.

FIG. 13 conceptually illustrates a computer system 1300 with which some embodiments of the invention are implemented. The computer system 1300 can be used to implement any of the above-described hosts, controllers, gateway, and edge forwarding elements. As such, it can be used to execute any of the above described processes. This computer system 1300 includes various types of non-transitory machine-readable media and interfaces for various other types of machine-readable media. Computer system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the computer system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) 1310 may be a single processor or a multi-core processor in different embodiments. The read-only-memory (ROM) 1330 stores static data and instructions that are needed by the processing unit(s) 1310 and other modules of the computer system 1300. The permanent storage device 1335, on the other hand, is a read-and-write memory device. This device 1335 is a non-volatile memory unit that stores instructions and data even when the computer system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory 1325 is a volatile read-and-write memory, such as random access memory. The system memory 1325 stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices 1340 enable the user to communicate information and select commands to the computer system 1300. The input devices 1340 include alphanumeric keyboards and pointing devices (also called "cursor control devices"). The output devices 1345 display images generated by the computer system 1300. The output devices 1345 include printers and display devices, such as cathode ray tubes (CRT) or liquid crystal displays (LCD). Some embodiments include devices such as touchscreens that function as both input and output devices 1340 and 1345.

Finally, as shown in FIG. 13, bus 1305 also couples computer system 1300 to a network 1365 through a network adapter (not shown). In this manner, the computer 1300 can be a part of a network of computers (such as a local area network ("LAN"), a wide area network ("WAN"), or an Intranet), or a network of networks (such as the Internet). Any or all components of computer system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for implementing an edge device that handles data traffic between a logical network and an external network, the method comprising:
monitoring resource usage of a node pool comprising a plurality of nodes that each executes a respective set of pods, each of the pods for performing a respective set of data message processing operations for at least one of a plurality of logical routers;
assigning one more core of a node device for processing threads for processing the data traffic between the logical network and the external network, the threads comprising a first thread assigned to a core of the node device;

determining (i) that one or more pods in a particular set of pods executing on a particular node in the node pool have reached a threshold limit of resource requests, and (ii) based on the threshold limit of resource requests being reached, that the particular node has insufficient resources for the particular set of pods executing on the particular node to adequately perform their respective sets of data message processing operations; and based on the determination, automatically providing additional resources to the node pool by instantiating at least one additional node in the node pool;

wherein the respective set of data message processing operations comprises a run-to-completion thread executed by an L4 pod.

2. The method of claim 1 further comprising automatically rescheduling at least one pod from the particular node to the additional node.

3. The method of claim 2, wherein:

the rescheduled pod is a first pod;

rescheduling the first pod to the additional node causes resources previously allocated to the first pod to become available to other pods on the particular node; and after the first pod is rescheduled to the additional node, an amount of resources allocated to the second pod on the particular node is increased.

4. The method of claim 2, wherein:

the rescheduled pod is a first pod; and after the first pod is rescheduled to the additional node, at least one additional instance of a second pod is scheduled on the additional node.

5. The method of claim 4, wherein the second pod performs stateless data message processing operations.

6. The method of claim 1, wherein the particular node executes (i) a first pod for performing a first set of data message processing operations for the plurality of logical routers and (ii) a second pod for performing a second set of data message processing operations for only a first logical router of the plurality of logical routers.

7. The method of claim 6, wherein:

the first set of data message processing operations comprises layer 2-layer 4 operations, and the second set of data message processing operations comprises layer 5-layer 7 service operations.

8. The method of claim 6, wherein:

the first pod is affinitized to the particular node; and automatically providing additional resources to the node pool by instantiating the at least one additional node in the node pool further comprising rescheduling the second pod to the additional node.

9. The method of claim 1, wherein the particular node is a first node in the particular node pool, the method further comprising:

determining that resources of a second node in the node pool are being underutilized by the second node's respective set of pods; and based on the determination:

identifying at least a third node in the node pool having a sufficient amount of resources available to ensure consistency of the respective sets of data message processing operations performed by the second node's respective set of pods;

rescheduling the second node's respective set of pods to the third node; and deleting the second node from the node pool.

10. The method of claim 1, wherein the node pool is one of a plurality of node pools that comprise a Kubernetes cluster for implementing the edge device.

11. The method of claim 1, wherein:

the plurality of nodes in the node pool comprises (i) a plurality of worker nodes on which the pods execute and (ii) a master node that schedules the pods on the worker nodes; and the method is performed by a cluster autoscaler that is part of the master node.

12. A non-transitory machine readable medium storing a program for execution by a set of processing units, the program for implementing an edge device that handles data traffic between a logical network and an external network, the program comprising sets of instructions for:

monitoring resource usage of a node pool comprising a plurality of nodes that each executes a respective set of pods, each of the pods for performing a respective set of data message processing operations for at least one of a plurality of logical routers;

assigning one more core of a node device for processing threads for processing the data traffic between the logical network and the external network, the threads comprising a first thread assigned to a core of the node device;

determining (i) that one or more pods in a first set of pods executing on a first node in the node pool have reached a threshold limit of resource requests, and (ii) based on the threshold limit of resource requests being reached, that the first node has insufficient resources for the first set of pods executing on the first node to adequately perform their respective sets of data message processing operations; and based on the determination, automatically providing additional resources to the node pool by instantiating at least a second node in the node pool, said second node for executing a second set of pods for performing respective sets of data message processing operations for at least one of the plurality of logical routers along with the first set of pods executing on the first node in the node pool;

wherein the respective set of data message processing operations comprises a run-to-completion thread executed by an L4 pod, the run-to-completion thread being pinned to a core.

13. The non-transitory machine readable medium of claim 12 further comprising a set of instructions for automatically rescheduling at least one pod from the first node to the second node, wherein the second set of pods comprises the at least one pod from the first node.

14. The non-transitory machine readable medium of claim 13, wherein:

the rescheduled pod is a first pod;

rescheduling the first pod to the second node causes resources previously allocated to the first pod to become available to other pods on the first node; and after the first pod is rescheduled to the second node, an amount of resources allocated to the second pod on the first node is increased.

15. The non-transitory machine readable medium of claim 13, wherein:

the rescheduled pod is a first pod;

after the first pod is rescheduled to the second node, at least one additional instance of a second pod is scheduled on the second node; and the second pod performs stateless data message processing operations.

16. The non-transitory machine readable medium of claim 12, wherein the first node executes (i) a first pod for performing a first set of data message processing operations for the plurality of logical routers and (ii) a second pod for performing a second set of data message processing operations for only a first logical router of the plurality of logical routers.

17. The non-transitory machine readable medium of claim 16, wherein:
the first set of data message processing operations comprises layer 2-layer 4 operations, and the second set of data message processing operations comprises layer 5-layer 7 service operations.

18. The non-transitory machine readable medium of claim 16, wherein:
the first pod is affinitized to the first node; and
the set of instructions for automatically providing additional resources to the node pool by instantiating at least the second node in the node pool further comprises a set of instructions for rescheduling the second pod to the second node.

19. The non-transitory machine readable medium of claim 12, the program further comprising sets of instructions for:
determining that resources of a third node in the node pool are being underutilized by the third node's respective third set of pods; and
based on the determination:
identifying at least a fourth node in the node pool having a sufficient amount of resources available to ensure consistency of the respective sets of data message processing operations performed by the third node's respective third set of pods;
rescheduling the third node's respective third set of pods to the fourth node; and
deleting the third node from the node pool.

20. The non-transitory machine readable medium of claim 12, wherein:
the plurality of nodes in the node pool comprises (i) a plurality of worker nodes on which the pods execute and (ii) a master node that schedules the pods on the worker nodes; and
the node pool is one of a plurality of node pools that comprise a Kubernetes cluster for implementing the edge device.

* * * * *